United States Patent [19]

Miyano et al.

[11] Patent Number: 4,989,951
[45] Date of Patent: Feb. 5, 1991

[54] CATADIOPTRIC LENS SYSTEM CAPABLE OF AUTOMATIC FOCUSING OPERATION

[75] Inventors: Masaaki Miyano; Kyoko Hashimoto, both of Osaka, Japan

[73] Assignee: Minolta Camera Kabushiki Kaisha, Osaka, Japan

[21] Appl. No.: 352,121

[22] Filed: May 15, 1989

[30] Foreign Application Priority Data

May 16, 1988 [JP] Japan ................... 63-118614

[51] Int. Cl.$^5$ .............................................. G02B 7/02
[52] U.S. Cl. .................... 350/255; 350/442; 350/618; 350/444
[58] Field of Search ........... 350/255, 257, 442, 429, 350/503, 504, 618, 444; 354/195.1, 400, 402, 406

[56] References Cited

U.S. PATENT DOCUMENTS

| | | | |
|---|---|---|---|
| 4,061,420 | 12/1977 | Kaprelian et al. | 350/442 |
| 4,449,807 | 5/1984 | Miki et al. | 354/195.1 |
| 4,523,816 | 6/1985 | Kreitzer | 350/442 |
| 4,553,817 | 11/1985 | Ando et al. | 350/255 |
| 4,690,516 | 9/1987 | Kanno | 350/444 |
| 4,757,354 | 7/1988 | Sato et al. | 350/442 |
| 4,802,738 | 2/1989 | Ando et al. | 350/257 |
| 4,890,133 | 12/1989 | Ogawa et al. | 354/402 |
| 4,934,805 | 6/1990 | Pinson | 350/429 |

FOREIGN PATENT DOCUMENTS 52-5848 2/1977 Japan .

Primary Examiner—Bruce Y. Arnold
Assistant Examiner—Loha Ben
Attorney, Agent, or Firm—Price, Gess & Ubell

[57] ABSTRACT

A catadioptric lens system capable of an automatic focusing operation without the necessity of increasing the outer diameter of a lens barrel is provided. The catadioptric lens system comprises a focusing optical unit, a focusing optical unit holder capable of movement in a direction of an optical axis of the lens band for holding the focusing optical unit, and a driving means disposed between a mount and a reflecting mirror which is disposed to reflect light coming from an object toward an object side and connected directly or indirectly to the focusing optical unit holder for transmitting a driving force to the focusing optical unit holder at a reduced speed so as to move the focusing optical unit holder in the direction of the optical axis to effect focusing.

13 Claims, 6 Drawing Sheets

CATADIOPTRIC LENS SYSTEM CAPABLE OF AUTOMATIC FOCUSING OPERATION

BACKGROUND OF THE INVENTION

1. Field of the Invention

This invention relates to a catadioptric lens system, and more particularly to a catadioptric lens system capable of an automatic focusing operation.

2. Description of the Prior Art

A catadioptric lens system capable of an automatic focusing operation has not yet been developed so far. In particular, conventional automatic focusing cameras employ a so-called phase difference detecting method for a focus detection operation thereof. According to the phase difference detecting method, a focus detecting operation is performed using two axial beams of light which pass near the optical axis of the lens on an exit pupil of the lens. (Here, an axial beam of light denotes a beam of light from an object on the optical axis of a lens in a field for photographing.) However, in the case of a catadioptric lens system, which includes at least a first mirror (hereinafter referred to as "main mirror") disposed to reflect light coming from an object toward an object side and a second mirror (hereinafter referred to as "secondary mirror") disposed to reflect the light from the main mirror toward an image side, beams of light for such focus detection are just eclipsed due to the presence of a secondary mirror. Accordingly, detection of a focus condition and automatic focusing operation cannot be achieved with a camera which employs a catadioptric lens system.

However, where a camera effects focus detecting operation using beams of light which pass through positions on the exit pupil at which no eclipse is caused by the secondary mirror as distinct from such an automatic focusing camera as described above, the focus detecting operation and the automatic focusing operation can be achieved with the camera using a catadioptric lens system. Such automatic focusing camera is disclosed, for example, in U.S. Pat. No. 4,794,416.

By the way, in an automatic focusing camera of the so-called body driven type wherein a focusing lens unit is driven by a motor provided in a camera body to effect focusing, the driving force of the motor is transmitted to the focusing lens unit when operative connection is established between a lens side coupler and a camera body side coupler which is connected to the motor in the camera body. Meanwhile, the lens unit includes a speed reducing system for transmitting a driving force received by the coupler on the lens side to a focusing lens set of the lens unit at a reduced speed. Such automatic focusing camera of the body driven type is disclosed, for example, in U.S. Pat. No. 4,449,807 and U.S. Pat. No. 4,553,817.

In a catadioptric lens system, however, if it is attempted to disposed a speed reducing system for transmission of driving force from a camera body side at a location nearer to an object than a primary mirror, then either the outer diameter of a lens barrel must be increased or a projected portion must be provided on an outer periphery of a lens barrel because beams of light at such location nearer to the object than the primary mirror pass at comparatively far positions from the optical axis.

A similar problem arises with a catadioptric lens unit used for an automatic focusing camera of the so-called in-lens motor type wherein a motor of a specific configuration such as an arcuate configuration is disposed in a lens unit for directly driving a focusing lens set. In particular, if it is attempted to dispose such motor at a location nearer to an object than a primary mirror, then either the outer diameter of a lens barrel must be increased or a projected portion must be provided on an outer periphery of a lens barrel, which is not preferable in any case.

SUMMARY OF THE INVENTION

It is an object of the present invention to provide a catadioptric lens system capable of an automatic focusing operation.

It is another object of the present invention to provide a catadioptric lens system capable of an automatic focusing operation without the necessity of increasing the outer diameter of a lens barrel.

It is a further object of the present invention to provide an automatically focusable catadioptric lens system which includes a transmission mechanism for driving a focusing lens which is most suitable for an automatic focusing camera of the body driven type.

In order to attain the objects, according to one aspect of the present invention, there is provided a catadioptric lens system capable of an automatic focusing operation which includes at least a first catoptric unit disposed to reflect light coming from an object toward an object side and a second catoptric unit disposed to reflect the light from the first catoptric unit toward an image side, which comprises a focusing optical unit for focusing, a focusing unit holder capable of the movement in the direction of the optical axis for holding the focusing optical unit, a mount for attaching the lens system to a camera body, and a driving means disposed between the mount and the first catoptric unit and connected to the focusing unit holder for transmitting a driving force to the focusing unit holder, wherein the focusing unit holder is moved in the direction of the optical axis by the driving force.

According to another aspect of the present invention, there is provided a catadioptric lens system capable of an automatic focusing operation which includes at least a first catoptric unit disposed to reflect light coming from an object toward an object side and a second catoptric unit disposed to reflect the light from the first catoptric unit toward an image side, and which is adapted to be mounted on a camera body having a motor which generates a driving force and a driving shaft which connects to the motor and transmits the driving force to the catadioptric lens system, which comprises a holder capable of the movement in the direction of the optical axis for holding at least the second catoptric unit, a driven shaft adapted to be connected to the driving shaft for receiving the driving force from the driving shaft, and a speed reducing system connected to the holder for transmitting the driving force received by the driving shaft at a reduced speed, wherein the holder is moved in the direction of the optical axis so as to effect focusing.

According to a further aspect of the present invention, there is provided a catadioptric lens system capable of an automatic focusing operation which includes at least a first catoptric unit disposed to reflect light coming from an object toward an object side and a second catoptric unit disposed to reflect the light from the first catoptric unit toward an image side, and which is adapted to be mounted on a camera body having a motor which generates a driving force and a driving shaft which connects to the motor and transmits the driving force to the catadioptric lens system, which comprises a dioptric unit located at the image side of the first catoptric unit for focusing, a holder capable of movement in the direction of the optical axis for holding the dioptric unit, a driven shaft adapted to be connected to the driving shaft for receiving the driving force from the driving shaft, a speed reducing system connected to the holder for transmitting the driving force received by the driving shaft at a reduced speed, wherein the holder is moved in the direction of the optical axis so as to effect focusing.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
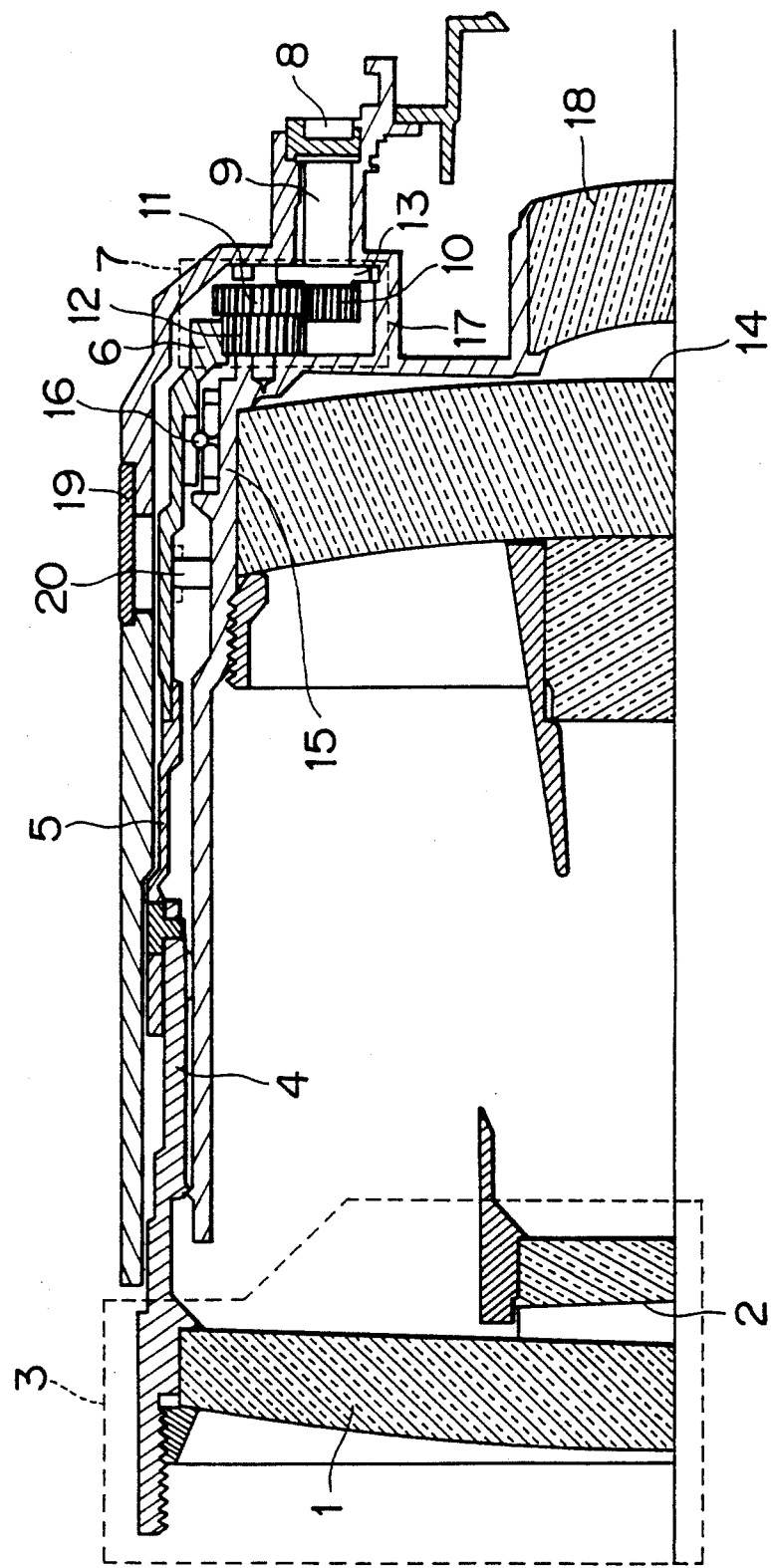
FIG. 1 is a partial sectional view of a catadioptric lens system taken along an optical axis thereof showing a first embodiment of the present invention.

Referring first to FIG. 1, there is shown a catadioptric lens system according to a first preferred embodiment of the present invention. The catadioptric lens system is applied to an automatic focusing camera of the so-called body driven type wherein the lens unit is driven by a motor installed in a camera body and a driving shaft connected to the motor to effect focusing.

The catadioptric lens system includes a focusing optical system 3 including a front lens 1 and a secondary mirror 2 secured to the front lens 1. In the catadioptric lens system of the present embodiment, focusing operation is achieved by movement of the front lens 1 and the secondary mirror 2 in the direction of an optical axis of the catadioptric lens system. The focusing optical system 3 is carried on a helicoid ring 4 which is connected to a speed reducing system 7 by way of a focusing interlocking ring 5 and a distance graduation ring 6. The distance graduation ring 6 is connected to the speed reducing system 7 through engagement of an internal gear formed thereon with a pinion gear 12 of the speed reducing system 7.

The speed reducing system 7 includes a coupler gear 10 provided on a driven shaft 9 of an AF (automatic focusing) coupler 8, an intermediate gear 11 held in meshing engagement with the coupler gear 10, and the aforementioned pinion gear 12 mounted in a coaxial relationship with the intermediate gear 11. The speed reducing system 7 has a function to receive, when the AF coupler 8 thereof is connected to another coupler not shown on the camera body side which is formed at the end of the driving shaft and connected to the motor in the camera body, driving force from the motor, reduce the speed of the driving force to a speed of driving force suitable for driving of the focusing optical system 3 and transmit the driving force of the thus reduced speed to the focusing optical system 3. The speed reducing system 7 is disposed between a primary mirror 14 and a mount. The intermediate gear 11 and pinion gear 12 of the speed reducing system 7 are disposed such that the axis thereof is located on the optical axis side with respect to the outer periphery of the primary mirror 14 and the distance to a location spaced farthest away from the optical axis of the pinion gear 12 is greater than a radius of the primary mirror 14.

The primary mirror 14 is in the form of a concave mirror disposed such that a concave surface thereof is opposed to an object. Accordingly, the spacing in the direction of the optical axis increases toward the outer periphery of the primary mirror 14 away from the optical axis. Consequently, a sufficiently large spacing in the direction of the optical axis in which the intermediate gear 11 and the pinion gear 12 are disposed can be assured.

Meanwhile, the pinion gear 12 is disposed such that the distance to a location thereof spaced farthest away from the optical axis may be smaller than or substantially equal to the radius of a primary mirror carrying frame 15. This disposition is effective to make compact or minimize the size of the distance graduation ring 6 held in meshing engagement with the pinion gear 12 and hence the outer diameter of the lens barrel.

A shaft on which the pinion gear 12 and intermediate gear 11 are provided is supported at an end thereof for rotation on a bearing means provided on the primary mirror carrying frame 15. A ball bearing 16 for supporting the distance graduation ring 6 for rotation thereon is also secured to the primary mirror carrying frame 15. A circumferential portion 17 extends axially from the primary mirror carrying frame 15 toward the film, and a gear base plate 13 is secured to the circumferential portion 17 and has another bearing means on which the other end of the shaft for the pinion gear 12 and intermediate gear 11 is supported for rotation. The circumferential portion 17 is thus located nearer to the optical axis than the speed reducing system 7 so that it prevents any grease scattered from the speed reducing system 7 from sticking to a rear lens 18 while it supports the speed reducing system 7 thereon together with the primary mirror carrying frame 15.

A distance graduation window 19 made of a transparent material such as glass is provided on an outer peripheral of the lens barrel such that distance graduations printed on the outer periphery of the distance graduation ring 6 may be observed through the distance graduation window 19. Meanwhile, a focusing stopper 20 is provided on the primary mirror carrying frame 15 and cooperates with another focusing stopper indicated by broken lines in FIG. 1 on the distance graduation ring 6 to define a range of rotation of the distance graduation ring 6 relative to the primary mirror carrying frame 15.

Driving force from the camera body side is received by the AF coupler 8 connected to the coupler not shown on the camera body and is transmitted to the distance graduation ring 6 by way of the speed reducing system 7 including the coupler gear 8, intermediate gear 11 and pinion gear 12 and rotates the distance graduation ring. Rotation of the distance graduation ring 6 is transmitted by way of the focusing interlocking ring 5 to rotate the helicoid ring 4 to move the focusing optical system 3 in the direction of the optical axis by way of a helicoid lead provided on the primary mirror carrying frame 15 to achieve focusing of the camera.

In the case of such catadioptric lens system wherein the focusing optical system 3 is located forwardly of the primary mirror 14 as in the embodiment shown in FIG. 1, if the axis of the pinion gear 12 is disposed on the optical axis side with respect to the outer periphery of the primary mirror 14 and the distance to a farthest location of the pinion gear 12 from the optical axis is set greater than the radius of the primary mirror 14, then the spacing in which the intermediate gear 11 and the pinion gear 12 should be disposed can be assured sufficiently and driving of the focusing optical system 3 in the catadioptric lens system for automatic focusing is enabled without any increase of the size of the distance graduation ring 6. Further, a portion of the distance graduation ring 6 is supported by a bearing, and torque at the coupler on the camera body side can be reduced.

It is to be noted that, where there is no problem of the spacing, the rotary shaft for the intermediate gear 11 and pinion gear 12 may be supported on the optical axis side with respect to the rotary shaft 9 of the coupler gear 10. The arrangement will achieve further compacting of the lens barrel.

Meanwhile, manual focusing can be attained by manually rotating the helicoid ring 4 exposed on the outer periphery of the lens barrel.

Subsequently, different embodiments of the present invention will be described with reference to sectional views of catadioptric lens systems shown in FIGS. 2 to 6. It is to be noted that like parts or elements are denoted by like reference numerals to those shown in FIG. 1 and overlapping description thereof will be omitted herein to avoid redundancy.

Figure 2:
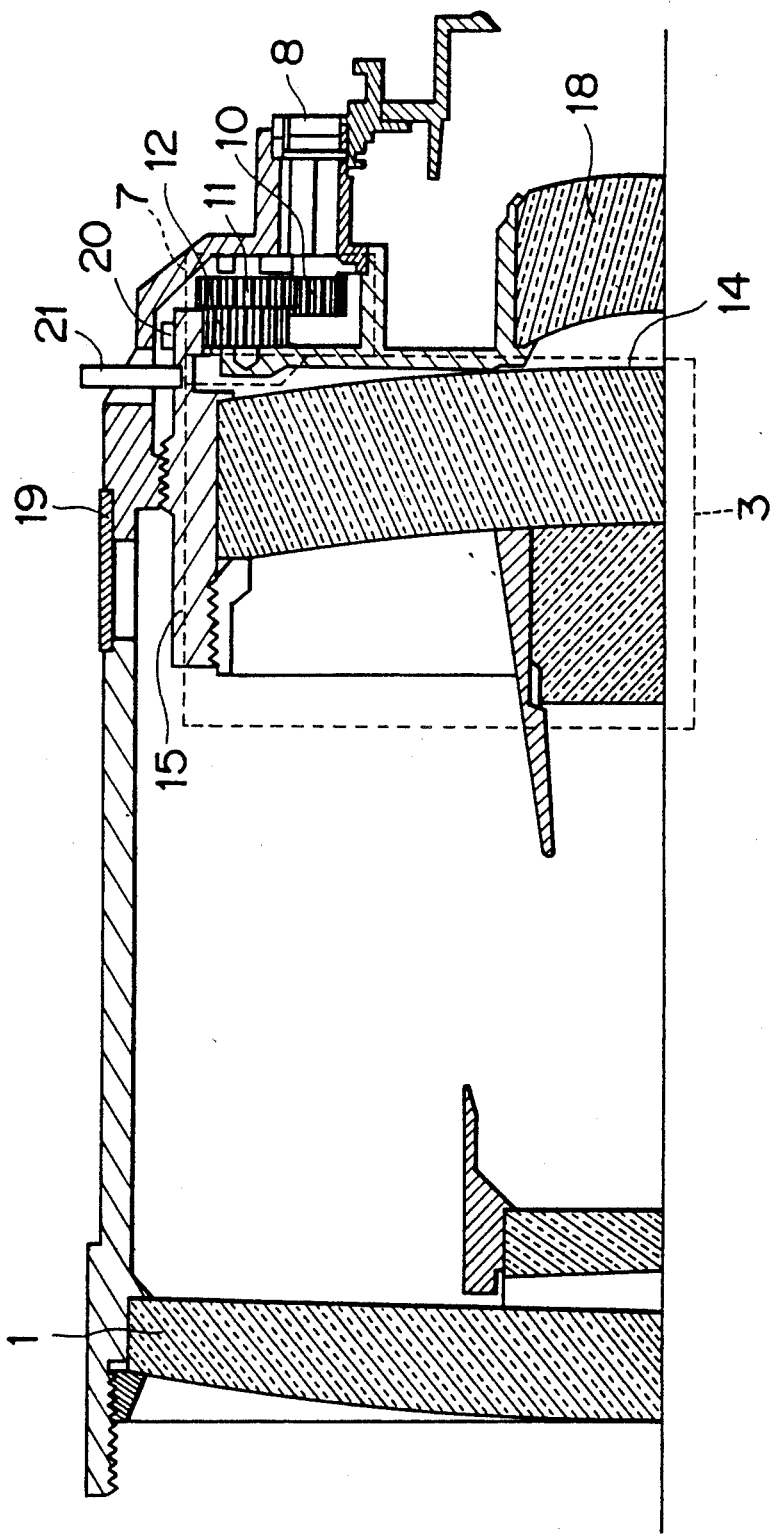
FIGS. 2 to 6 are similar views but individually showing different embodiments of the present invention.

Referring first to FIG. 2, there is shown a catadioptric lens system according to a second preferred embodiment of the present invention wherein a focusing optical system 3 includes a primary mirror 14 and a lens located forwardly of the primary mirror 14 and focusing is effected by movement of the focusing optical system 3 in the direction of the optical axis of the catadioptric lens system. In the catadioptric lens system, a primary mirror carrying frame 15 thus serves also as the distance graduation ring 6, focusing interlocking ring 5 and helicoid ring 4 in the preceding embodiment shown in FIG. 1. In particular, a helicoid is formed on the primary mirror carrying frame 15 for engaging with an outer periphery of a lens barrel on which a front lens 1 is carried while distance graduations are printed on an outer periphery of the primary mirror carrying frame 15 around which a transparent distance graduation window 19 is provided. A manual focusing knob 21 is connected to the primary mirror carrying frame 15 extending through a cutout formed in an outer wall of the lens barrel. Manual focusing operation of the focusing optical system 3 can thus be performed by a manual turning operation of the manual focusing knob 21.

Also with the catadioptric lens system of the embodiment shown in FIG. 2, the arrangement of a speed reducing system 7, a pinion gear 12 and a primary mirror 14 is similar to that in the embodiment shown in FIG. 1. Accordingly, the lens barrel is not increased in size at all.

Figure 3:
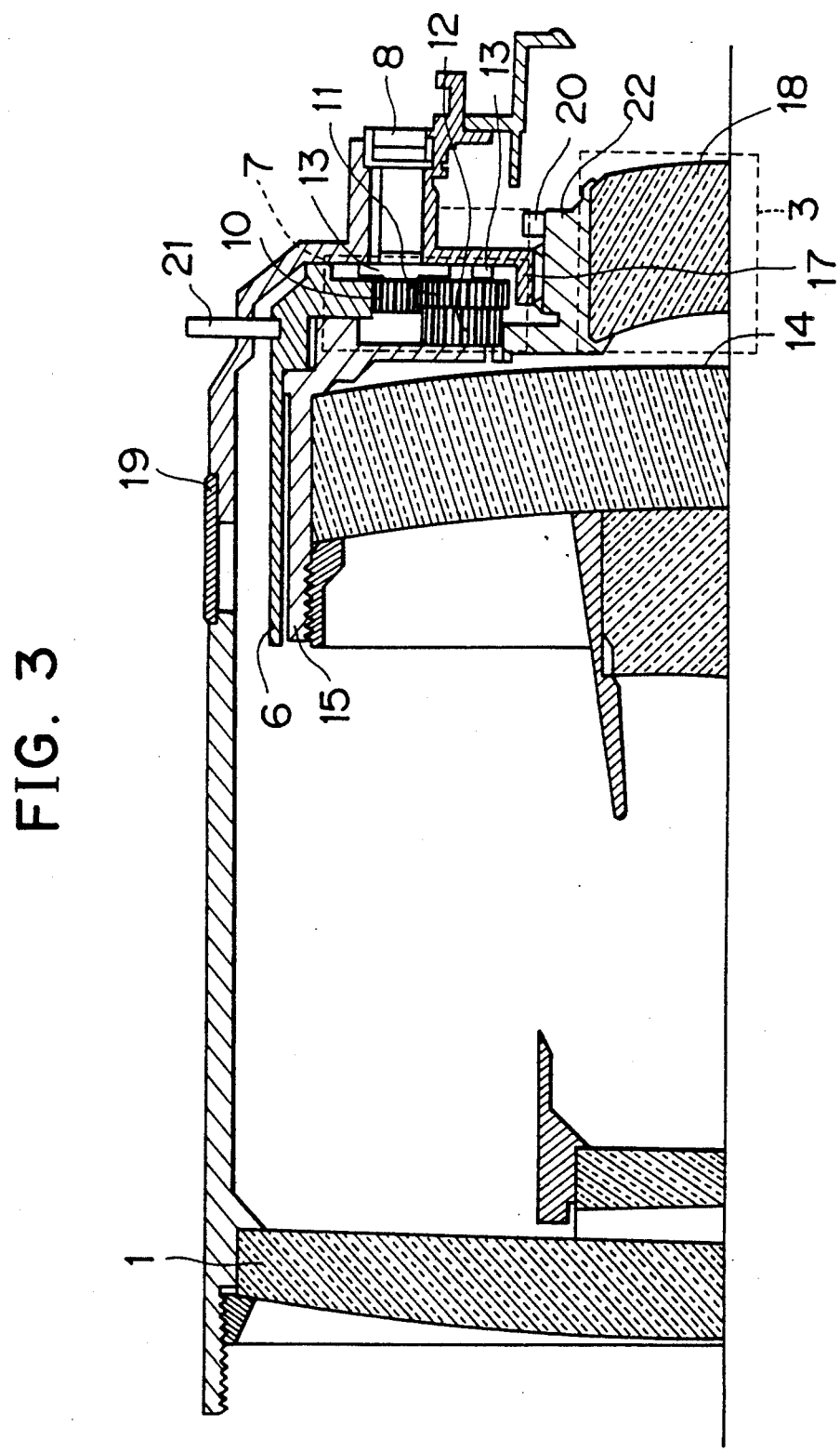

Referring now to FIG. 3, there is shown a catadioptric lens system according to a third preferred embodiment of the present invention wherein a rear lens 18 is used as a focusing optical system 3. In the arrangement shown, since a speed reducing system 7 only must transmit a driving force to a rear lens carrying frame 22 on which the rear lens 18 is carried, an intermediate gear 11 and a pinion gear 12 are supported for rotation at a location on the optical axis side with respect to a coupler gear 10. A helicoid is formed on an outer periphery of the rear lens carrying frame 22 for engaging with a circumferential portion 17, and a focusing stopper 20 is also provided on the outer periphery of the rear lens carrying frame 22. Where a distance graduation ring 6 is connected to the coupler gear 10 of the speed reducing system 7, it serves also as a ring for a manual focusing operation and a manual focusing knob 21 can be located similarly to that in the embodiment shown in FIG. 2. The arrangement of the present embodiment is further advantageous for compacting of the lens barrel because the pinion gear 12 and intermediate gear 11 are supported for rotation on the optical axis side with respect to the coupler gear 10.

Figure 4:
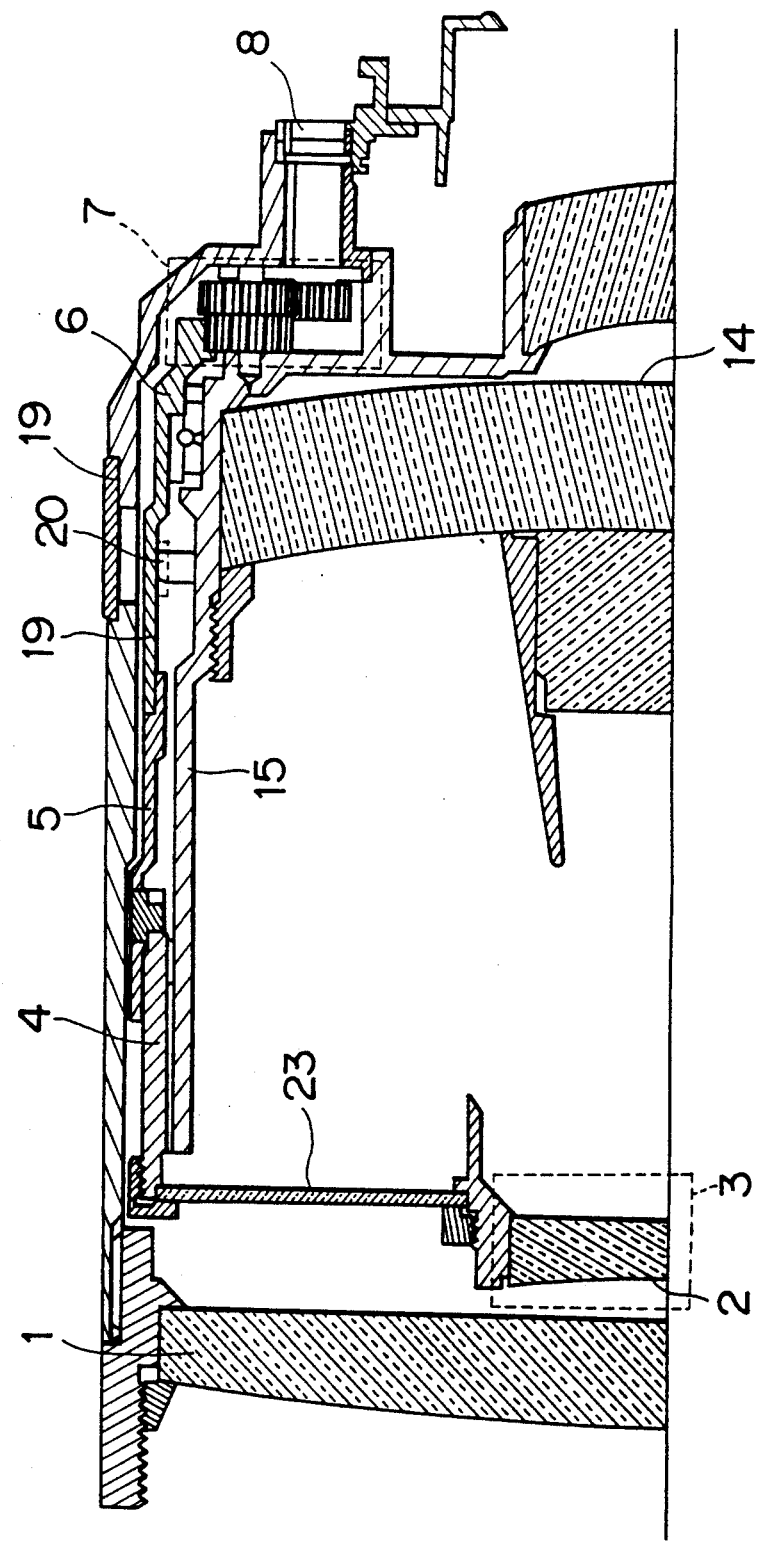

FIG. 4 shows a catadioptric lens system according to a fourth preferred embodiment of the present invention wherein a focusing operation is effected by a secondary mirror 2. Referring to FIG. 4, a front lens 1 is secured to a lens barrel, and a helicoid ring 4 similar to the helicoid ring 4 in the first embodiment shown in FIG. 1 supports thereon the secondary mirror 2 by way of a flat glass plate or a lens 23 having little refractive power. Such flat glass plate or lens 23 will cause no eclipse of beams of light for focus detecting operation.

Figure 5:
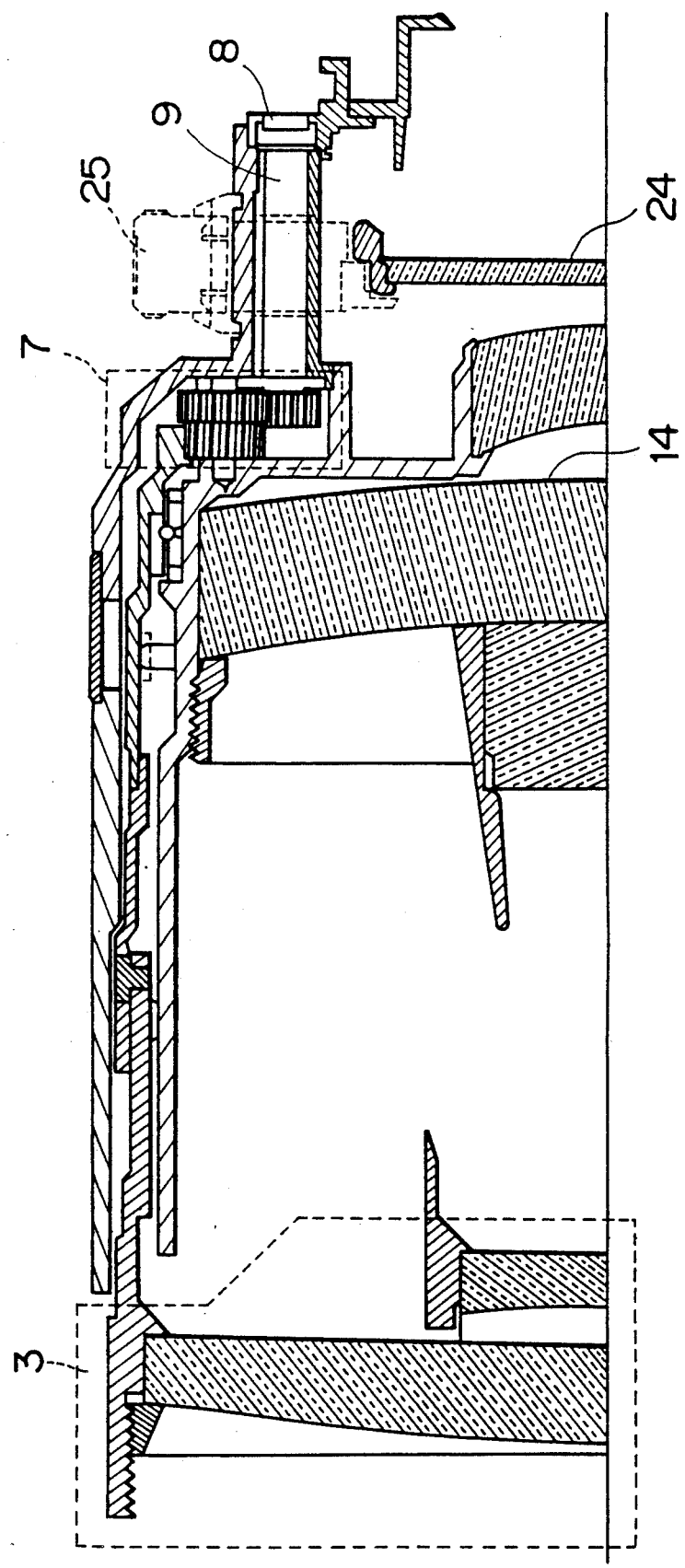

FIG. 5 shows a catadioptric lens system according to a fifth preferred embodiment of the present invention. The catadioptric lens system shown in FIG. 5 is of such a front focusing type, in which a focusing optical system 3 having a front lens and a secondary mirror effects a focusing operation, as shown in FIG. 1 and employs an optical system which has a comparatively great distance between a primary mirror 14 and a lens mount in order to permit use of a filter 24 inserted into a portion between the primary mirror 14 and the lens mount. Since an insertion filter holder 25 is not located in the same sectional plane with a speed reducing system 7, it is indicated by a broken line. Namely, in order the enable to use of the filter 24 as described above, an AF coupler 8 and the speed reducing system 7 should be interconnected by a long driven shaft 9 using an optical system wherein the distance between the primary mirror 14 and the lens mount is comparatively great.

Figure 6:
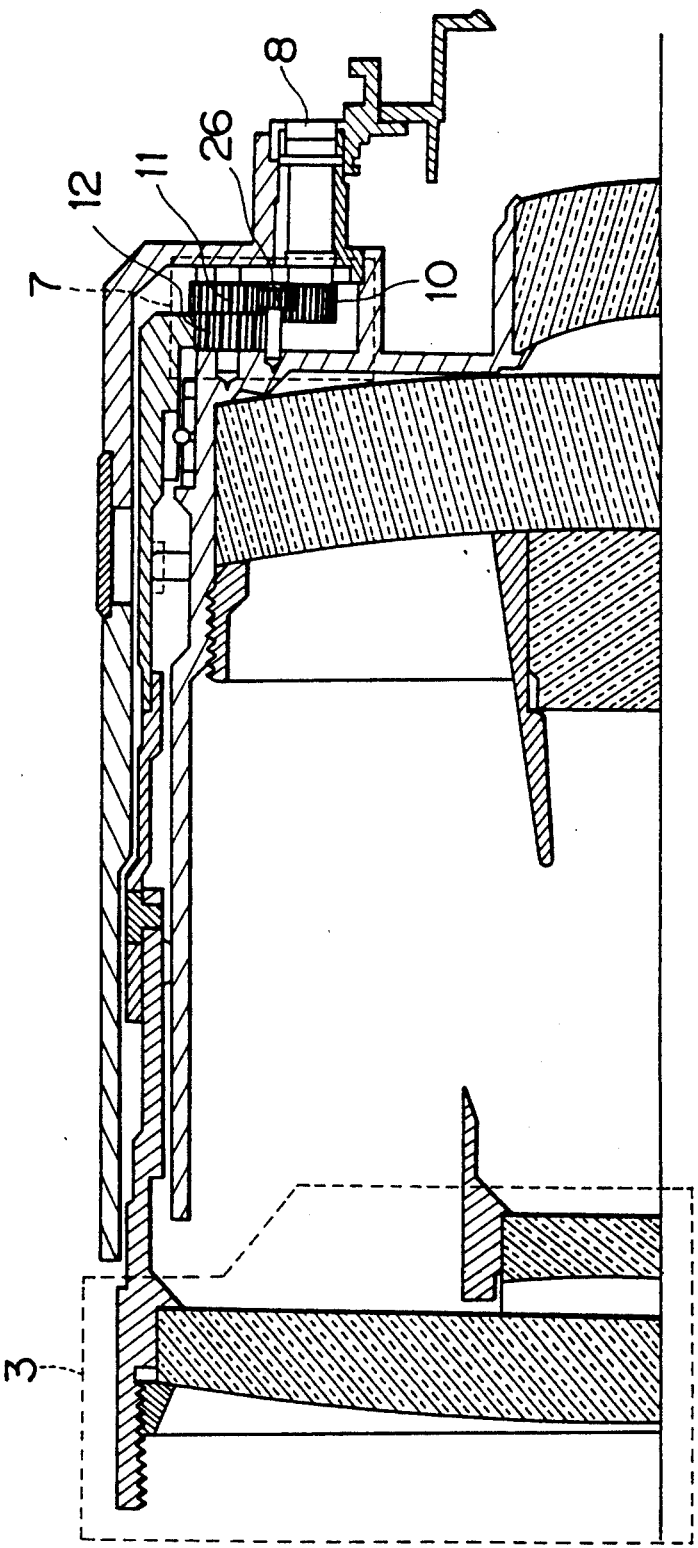

Referring now to FIG. 6, there is shown a catadioptric lens system according to a sixth preferred embodiment of the present invention wherein a speed reducing system 7 includes an idle gear 26 for adjustment of a distance between two gears. The catadioptric lens system here is of the front focusing type such as shown in FIG. 1. When a suitable speed reduction ratio is selected in accordance with the characteristics of the catadioptric lens unit and an automatic focusing system of the camera, if the distance between an axis of a coupler gear 10 coaxial with an AF coupler 8 and another axis of a speed reduction gear train consisting of an intermediate gear 11 and a pinion gear 12 is increased, then the idle gear 26 should be inserted between the coupler gear 8 and the intermediate gear 11 to interconnect the coupler gear 10 and the intermediate gear 11.

While in the embodiments described hereinabove a catadioptric lens system of the present invention is applied to an automatic focusing camera of the so-called body driven type, the present invention is not limited to a catadioptric lens system which is applied to an automatic focusing camera of the body driven type.

In particular, the present invention can be applied to an automatic focusing camera of the so-called in-lens motor type wherein a motor for driving a focusing lens system is disposed in a lens unit. In short, if a motor and a speed reducing system both disposed in a lens unit are located between a primary mirror and a lens mount rearwardly of the primary mirror, then it is possible to design a catadioptric lens system having a motor in its lens unit without increasing the outer diameter of a lens barrel of the same. In this instance, if the speed reducing system is disposed in a similar manner as in the embodiments described hereinabove, then a further compacted catadioptric lens system can be attained.

Having now fully described the invention, it will be apparent to one of ordinary skill in the art that many changes and modifications can be made thereto without departing from the spirit and scope of the invention as set forth herein.

What is claimed is:

1. A catadioptric lens system capable of an automatic focusing operation which includes at least a first catoptric unit disposed to reflect light coming from an object toward an object side and a second catoptric unit disposed to reflect the light from said first catoptric unit toward an image side, comprising:
    a focusing optical unit for focusing;
    a focusing unit holder holding said focusing optical unit, said focusing unit holder being moveable in a direction of an optical axis;
    a mount for attaching the lens system to a camera body; and
    a driving means disposed between said mount and said first catoptric unit and connected to said focusing unit holder for transmitting a driving force generated by a motor to said focusing unit holder, wherein said focusing unit holder is moved in the direction of the optical axis by said driving force.

2. A catadioptric lens system capable of an automatic focusing operation as claimed in claim 1, wherein said catadioptric lens system is mounted on a camera body having said motor which generates said driving force and a driving shaft which connects to said motor and transmits said driving force to said driving means, and said driving means includes a driven shaft to be connected to said driving shaft for receiving said driving force and a speed reducing system for transmitting said driving force received by said driven shaft to said focusing unit holder at a reduced speed.

3. A catadioptric lens system capable of an automatic focusing operation as claimed in claim 2, wherein said speed reducing system is composed of a plurality of gears.

4. A catadioptric lens system capable of an automatic focusing operation as claimed in claim 3, wherein one of said gears which transmits said driving force to said focusing unit holder last is disposed such that a first distance from the optical axis to the axis of said one of said gears is smaller than the radius of said first catoptric unit and a second distance from the optical axis to a point of said one of said gears which is farthest from the optical axis is greater than said radius.

5. A catadioptric lens system capable of an automatic focusing operation as claimed in claim 4, wherein said one of said gears is disposed such that the second distance is smaller than or substantially equal to a radius of said focusing unit holder.

6. A catadioptric lens system capable of an automatic focusing operation as claimed in claim 3, wherein said focusing optical unit consists of said second catoptric unit and a first dioptric unit located at the object side of said second catoptric unit.

7. A catadioptric lens system capable of an automatic focusing operation as claimed in claim 3, wherein said focusing optical unit includes said first dioptric unit.

8. A catadioptric lens system capable of an automatic focusing operation as claimed in claim 3, wherein said focusing optical unit includes said first catoptric unit.

9. A catadioptric lens system capable of an automatic focusing operation as claimed in claim 3, wherein said focusing optical unit consists of said second catoptric unit.

10. A catadioptric lens system capable of an automatic focusing operation as claimed in claim 3, wherein said focusing optical unit consists of a second dioptric unit located at the image side of said first catoptric unit.

11. A catadioptric lens system capable of an automatic focusing operation which includes at least a first catoptric unit disposed to reflect light coming from an object toward an object side and a second catoptric unit disposed to reflect the light from said first catoptric unit toward an image side, and which is adapted to be mounted on a camera body having a motor which generates a driving force and a driving shaft which connects to said motor and transmits said driving force to the catadioptric lens system, comprising:
    a holder for holding at least said second catoptric unit, said holder being moveable in a direction of an optical axis;
    a driven shaft adapted to be connected to said driving shaft for receiving said driving force from said driving shaft; and
    a speed reducing system connected to said holder for transmitting said driving force received by said driving shaft at a reduced speed,
    wherein said holder is moved in the direction of the optical axis so as to effect focusing.

12. A catadioptric lens system capable of an automatic focusing operation as claimed in claim 11, wherein said holder further holds a dioptric system located at the object side of said second catoptric unit.

13. A catadioptric lens system capable of an automatic focusing operation which includes at least a first catoptric unit disposed to reflect light coming from an object toward an object side and a second catoptric unit disposed to reflect the light from said first catoptric unit toward an image side, and which is adapted to be mounted on a camera body having a motor which generates a driving force and a driving shaft which connects to said motor and transmits said driving force to the catadioptric lens system, comprising:
    a dioptric unit located at the image side of said first catoptric unit for focusing;
    a holder for holding said dioptric unit, said holder being moveable in a direction of an optical axis;
    a driven shaft adapted to be connected to said driving shaft for receiving said driving force from said driving shaft; and
    a speed reducing system connected to said holder for transmitting said driving force received by said driving shaft at a reduced speed,
    wherein said holder is moved in the direction of the optical axis so as to effect focusing.

* * * * *